United States Patent [19]

Ramer

[11] 4,282,444
[45] Aug. 4, 1981

[54] METHOD FOR DEEP SHAFT PUMPBACK ENERGY GENERATION

[76] Inventor: James L. Ramer, 1432 J Big Bend Rd., Waukesha, Wis. 53186

[21] Appl. No.: 22,560

[22] Filed: Mar. 21, 1979

[51] Int. Cl.³ .................. F01D 15/10; H02K 7/18; B65G 5/00; E21F 17/16
[52] U.S. Cl. ................... 290/52; 290/1 R; 290/54; 60/398; 405/58
[58] Field of Search ............ 290/52, 1 R, 54, 43; 60/398, 641, 652, 659; 405/55, 57–58

[56] References Cited

U.S. PATENT DOCUMENTS

| | | | |
|---|---|---|---|
| 1,217,165 | 2/1917 | Fessenden | 60/641 |
| 3,140,986 | 7/1964 | Hubbard | 60/641 |
| 3,277,654 | 10/1966 | Shiver | 405/55 |

*Primary Examiner*—S. J. Witkowski
*Assistant Examiner*—John B. Conklin
*Attorney, Agent, or Firm*—Darrell E. Hollis

[57] ABSTRACT

A method and apparatus are disclosed for converting the potential energy stored in an upper reservoir of water into electrical energy, whereby, during periods of high energy demand, water is introduced from the upper reservoir into an underground salt dome by way of an underground shaft which connects the upper reservoir with the underground salt dome. Hydroelectric generators which are located along the shaft convert the kinetic energy of the falling water into electrical energy to meet periodic high energy demands. The water empties into the underground salt dome and dissolves a cavity in the same to produce a large underground reservoir. During periods of electrical energy surplus, electric pumps are utilized to pump the water back to the surface so that the process may be repeated.

1 Claim, 2 Drawing Figures

METHOD FOR DEEP SHAFT PUMPBACK ENERGY GENERATION

BACKGROUND OF THE INVENTION

1. Field of the Invention

The present invention relates generally to a method and apparatus for converting the potential energy stored in an upper reservoir of water into electrical energy during periods of high energy demand, use being made of a subterranean salt dome reservoir.

2. Brief Description of the Prior Art

Underground pumped storage facilities have been proposed wherein water from an upper reservoir flows through a subterranean shaft, through a subterranean hydroelectric power generator, and into an underground reservoir to produce electricity during periods of high energy demand. The water is then pumped back to the surface during periods of low energy demand by electric pumps which run on excess energy which would otherwise be wasted. Underground pumped storage facilities, however, have not been constructed because of the great cost required to excavate large underground reservoirs at depths which would be necessary for efficient underground pumped storage power generation.

Underground cavities excavated by solutionization have been used in the recovery of geotherman energy from below the earth, as evidenced, for example, by the patents to Jacoby U.S. Pat. No. 3,661,424 and 3,676,078. Water is introduced into the salt dome and dissolves the surrounding salt to form a reservoir in the dome. The water is then pumped out of the reservoir to form a hollow underground cavity. Heated air is extracted from the cavity and is passed through a heat-exchanger located on the surface so that the geothermal energy stored below the earth's surface may be utilized.

SUMMARY OF THE INVENTION

The present invention relates to a method and apparatus for generating hydroelectric power during periods of high energy demand utilizing an underground pumped storage plant, wherein the lower reservoir is formed by dissolving a cavity in a salt dome. The apparatus is preferably located in an area where a large body of water is located adjacent large underground salt domes (for example, the Louisiana/Texas Gulf Coast region, or the Great Salt Plains for southern Kansas and northern Oklahoma). By utilizing a salt dome located very near the Gulf of Mexico, it is possible for sea water from the Gulf to be introduced into the salt cavity without interfering with fresh water streams, thereby providing a virtually unlimited reservoir of water for hydroelectric power generation.

The hydroelectric power generator system includes a deep water conducting shaft connected at its upper end with a natural reservoir of water and connected at its lower end with the salt dome cavity. At least one hydroelectric power generator is located intermediate the ends of the shaft, and a electric lamp is provided for pumping water out of the salt cavity. During periods of high electrical energy demand, water is introduced into the upper end of the shaft and flows downwardly through the shaft under the influence of gravity to drive the hydroelectric power generator. When the water reaches the salt dome it dissolves the salt, thereby enlarging the cavity.

During periods of electrical energy surplus, the water is pumped out of the salt dome reservoir and back to the surface by electrical pumps driven by the excess available electrical energy. After the initial cavity has been formed, the above steps are repeated and energy is produced as enlargement of the cavity proceeds. Environmental effects of the salt water on the natural surface reservoir at the pumpback discharge point would be minimized because approximately twelve hours would be available between discharges, thereby permitting some dilution of the salt solution by the natural body of water.

After the cavity has reached a sufficient size, the saturated—which has a higher specific gravity than water obtained directly from the natural reservoir—which has been pumped back to the surface, may be reintroduced into the shaft, thereby increasing the generation efficiency and minimizing further enlargement of the cavity by solutionization.

A deep large volume salt mining operation accessible to any large quantity of water would be equally suitable. Such installations would have a major impact in conventional power plant fuel consumption by encouraging operating efficiencies, namely, the consumption of surplus power normally lost. By providing additional power during periods of high energy demand, they could offer an environmentally acceptable alternative to large capital commitments for new or expanded fossil fuel or nuclear installations.

BRIEF DESCRIPTION OF THE DRAWING

Other objects and advantages of the invention will become apparent from a study of the following specification when viewed in light of the accompanying drawing in which.

DETAILED DESCRIPTION OF THE INVENTION

Figure 1:
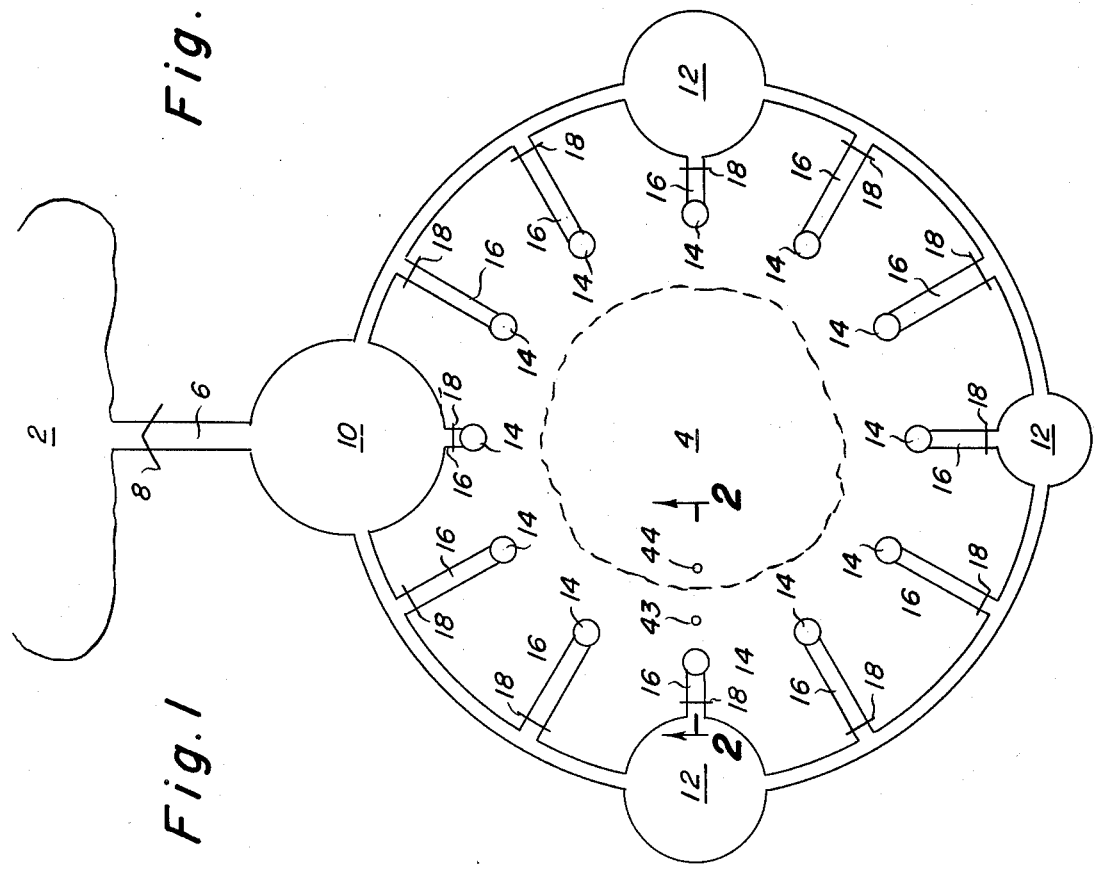
FIG. 1 is a top view of the hydroelectric power generating apparatus of the present invention.

Referring first to FIG. 1, the deep shaft pumpback hydroelectric generator system is located near a large natural body of water 2 which serves as the upper reservoir and an underground salt dome 4. An inland channel 6 having a flood control gate 8 connects the upper reservoir 2 with the hydroelectric generating system. The hydroelectric generating system includes a main water reservoir 10 and a plurality of smaller flow equalizing water reservoirs 12 located concentrically about the salt dome 4. A plurality of water conducting power shafts 14 are connected with the water supply by power channels 16 having flow control gates 18.

Figure 2:
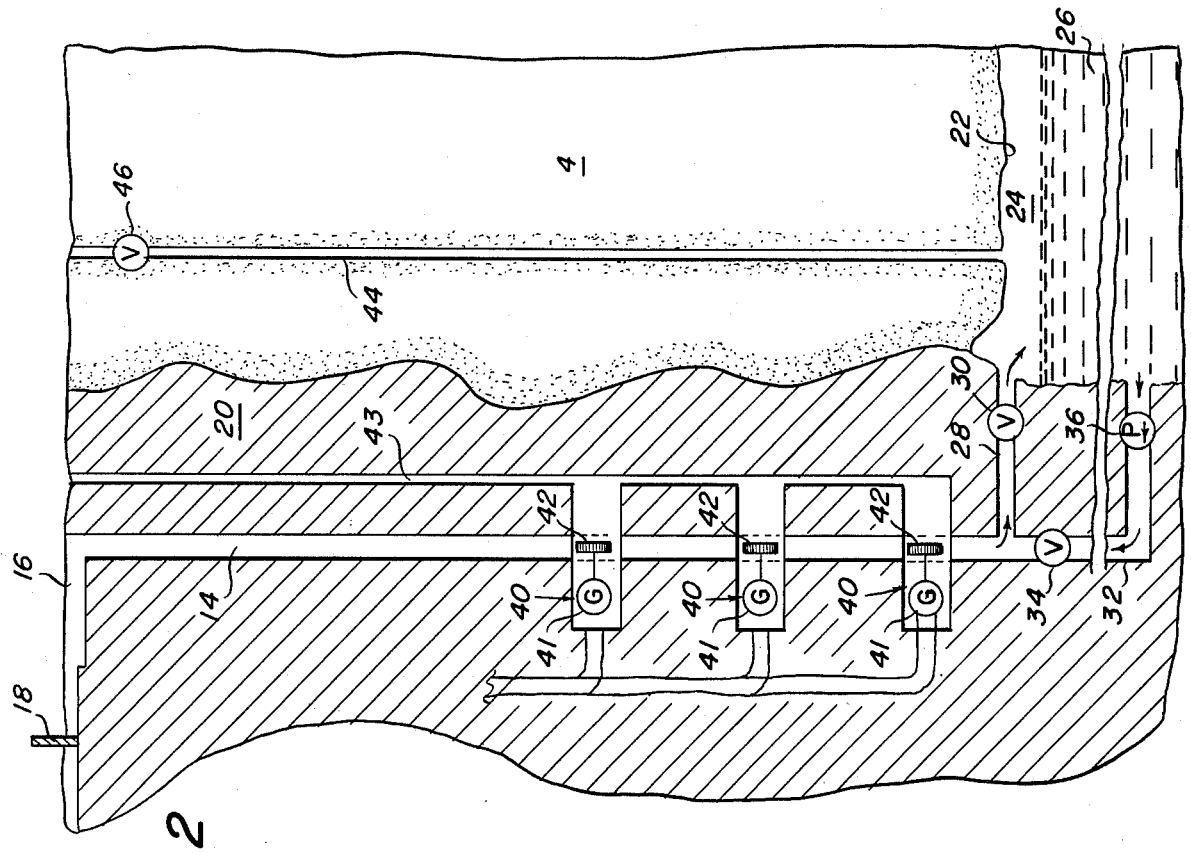
FIG. 2 is a cross sectional view taken along line 2—2 of FIG. 1.

As shown in FIG. 2, the generally vertical main power shaft 14 is drilled in the rock 20 which surrounds the salt dome. The main power shaft 14 is connected at its upper end with the power channel 16 and at its lower end with an underground salt cavity 22 including an air chamber 24 located above an underground reservoir 26. Water from the main shaft 14 flows into the cavity 22 by way of an inflow tunnel 28 having an inflow valve 30. Water is pumped out of the cavity 22 and back up the power shaft through pumpback tunnel 32 which includes a pumpback value 34 and a pump 36. A plurality of equipment galleries 40 are provided along the power shaft 14 to house the hydroelectric generators 41 having impeller or drive means 42 arranged in the shaft 14.

Pumps and other equipment may also be housed in the equipment galleries 40. A personnel shaft 43 allows access to the equipment galleries 40 for installation and maintenance purposes. Air pressure relief shaft 44, which has a value 46, connects the air chamber 24 with the surface and allows the air pressure in the underground air chamber 24 to be controlled. As an example, the air pressure might be tapped to supercharge an on-site internal combustion engine.

OPERATION

In operation, water from the body of water 2 flows through the inland channel 6 and into the reservoirs 10 and 12 as shown in FIG. 1. Pumpback valve 34 is closed and inflow valve 30 is opened allowing water to flow down the shaft 14 and through the equipment galleries 40 which contain the hydroelectric power generators, thereby producing energy for use during periods of high demand. The water then flows through the inflow tunnel 28 and empties into the underground reservoir 26. The freshly introduced water is not saturated with salt and consequently it begins to dissolve the salt dome 4 thereby enlarging the chamber 22. During periods of low energy demand, pumpback valve 34 is opened, inflow valve 30 is closed, and water is pumped back up the power shaft 14 by one or more electrical pumps 36 which may be located in the pumpback tunnel 32, in the equipment galleries 40, or at any other suitable location along the water conducting path.

Theoretical Power Production Per One Site

Assume each generator site requires an area 150' in diameter. Further assume each site will be 6500' deep, broken into 5–1,200' cascades.
Using an 81% net efficiency and a 1.00 load factor,
Instantaneous $K_W = P_K + (QHE)/11.8F$
Where:
Q = 1000 CFS
H = 1,200'
E = 0.81
F = 1.00
$P_K = (1000 \times 1200 \times 0.81)/11.8 \times 1.00)$
$P_K = 82,373$ $K_W = 82.3$ Megawatts ($M_W$)
$P_K$ total per one 5 cascade shaft = $82.3 \times 5 = 411.5$ $M_W$
and assuming that each salt dome can contain 30 power shafts per site, each 150' in diameter, the power production capacity would be $30 \times 411.5$ $M_W$ or 12,345 $M_W$ per site.

Fuel Savings for one 30 Power Plant Site

1 KWH = 3413 BTU
12,345 MGW = 12,345 KW
40 Hours of generating per week
$40 \times 12,345,000 = 493,800,000$ KWH
$493,800,000 \times 3413 = 1.6853 \times 10^{12}$ BTU/WEEK
1,685,300,000 BTU/WEEK
1 ton coal = 26,200,000 BTU
1 barrel No. 5 residual oil = 6,290,000 BTU
1 cubic foot natural gas = 1,031 BTU
A thermal electric power plant can, at best, convert only one third of the potential BTU's available in the basic fuel into electric energy.
COAL: 26,200,000/3 = 8,733,333 available BTU converted to electrical energy. $(1.6853 \times 10^{12})/(8,733,333 \times 10^6) = 192,973$ tons of coal saved per week; $192,973 \times 52 = 10,034,596$ tons of coal saved per year.
OIL: 6,290,000/3 = 2,096,667 available BTU converted to electrical energy. $(1.6853 \times 10^{12})/(2.096667 \times 10^6) = 803,800$ barrels of oil saved per week: $803,800 \times 52 = 41,797,600$ barrels of oil saved per year.
NATURAL GAS: 1,031/3 = 344 available BTU converted to electrical energy. $(1.6853 \times 10^{12})/(3.44 \times 10^2) = 4,899,127,907$. About $0.4899 \times 10^{10}$ cubic feet of natural gas is saved per week, and about $(0.4899 \times 10^{10}) \times 52 = 25.4755 \times 10^{10}$ cubic feet of natural gas are saved per year.

Pump Back Power Consumption

The power consumed for pumping the water back to the surface will be greater than the power produced by an approximate 3:2 ratio.

Hydroelectric power plants can convert approximately 81% of the available mechanical energy into electrical energy. This high efficiency, combined with the fact that electrical energy that would normally be wasted is being used to pump the water into position for use to drive electrical generators, makes pump back generation economically feasible and in reality saves fuel. The ability of pump back facilities to supply electrical energy to meet high periodic demand on a daily basis, means that this amount of thermal electrical capacity does not have to be installed, only to be wasted once the daily peak passed.

If combustion turbines are installed to meet the peaking demand, the fuel consumption is as high or higher than for steam thermal electric generating plants. The only gain is that a combustion turbine can be shut down after the peak demand has passed. Combustion turbines are a high maintenance, low service life machine. Hydraulic turbines, pumps, and coupled electrical machinery, however, have a very long, low maintenance, service life.

While the preferred embodiment has been described, it will be understood that modifications and variations may be effected without departing from the spirit and scope of the novel concepts of this invention.

What is claimed is:
1. The method of making a system for converting the potential energy stored in an upper reservoir of water into electric power during periods of high energy demand, use being made of a subterranean salt dome reservoir, which comprises the steps of:
   (a) forming a generally vertical shaft through rocks surrounding the salt dome between the upper reservoir and the salt dome reservoir;
   (b) arranging the drive means of a hydroelectric generator intermediate the ends of said shaft;
   (c) supplying water from said upper reservoir, during a period of high energy demand, to said shaft, thereby causing the water to fall by gravity downwardly through said shaft;
   (d) converting the kinetic energy of the falling water into electric energy by use of said hydroelectric generator; (e) introducing the water into the salt dome reservoir to dissolve the salt, thereby increasing the voluem of the salt dome reservoir, whereby electrical power porducing capacity is increased;
   (f) electrically pumping the water from said salt dome reservoir to said upper reservoir during periods of electrical energy surplus; and
   (g) repeating steps (c)–(f) above to progressively dissolve the salt and thereby progressively increase the volume of said salt dome reservoir to a specific size.

* * * * *